Jan. 15, 1935.  A. D. MacLEAN ET AL  1,987,836
COMPENSATING AND CALIBRATING ORIFICE METER
Filed Feb. 21, 1931  2 Sheets-Sheet 1
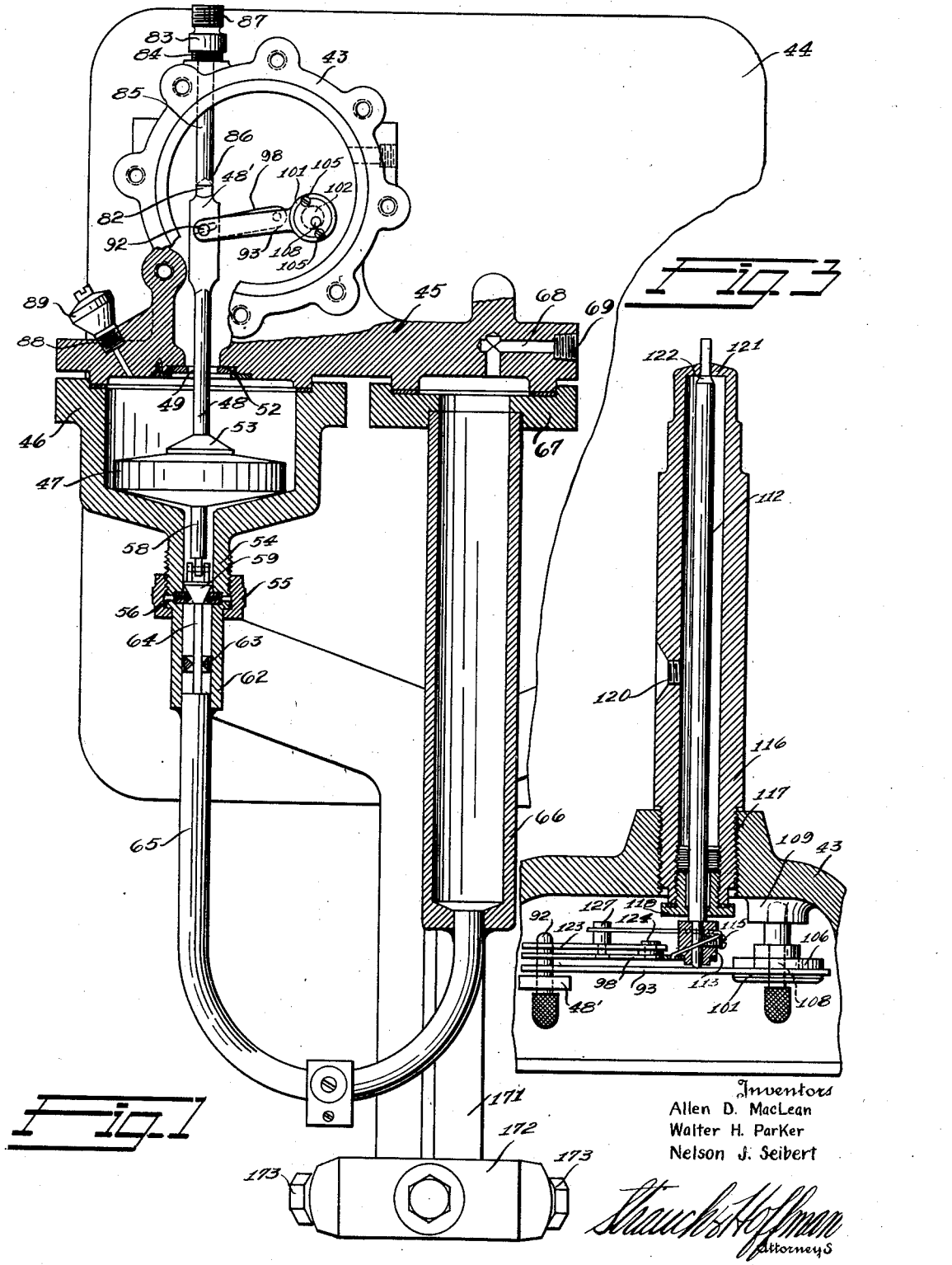
Inventors
Allen D. MacLean
Walter H. Parker
Nelson J. Seibert

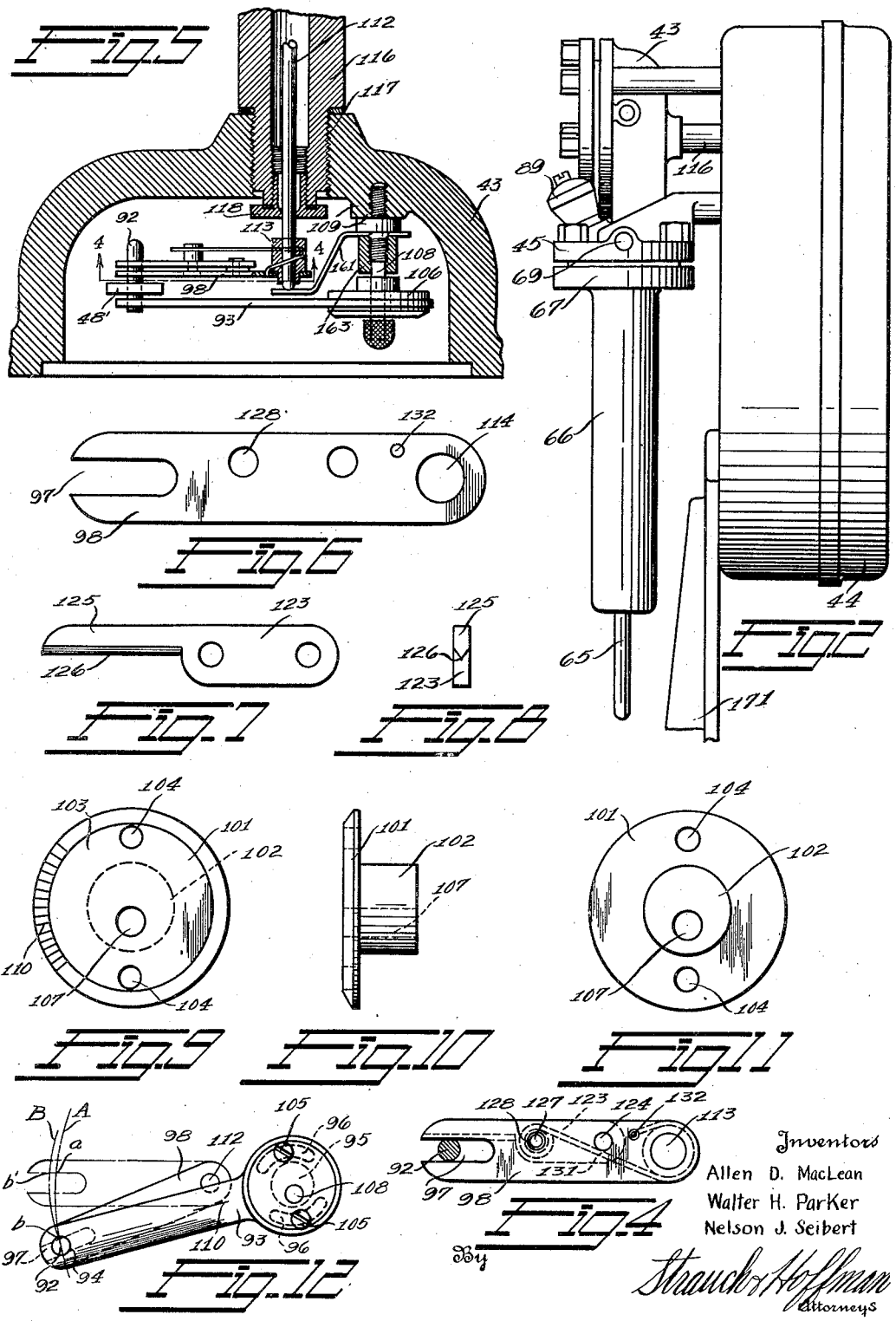

Patented Jan. 15, 1935

1,987,836

UNITED STATES PATENT OFFICE 1,987,836

COMPENSATING AND CALIBRATING ORIFICE METER

Allen D. MacLean, Wilkinsburg, Walter H. Parker, Pittsburgh, and Nelson J. Seibert, Wilkinsburg, Pa., assignors to Pittsburgh Equitable Meter Company, Pittsburgh, Pa., a corporation of Pennsylvania Application February 21, 1931, Serial No. 517,580

20 Claims. (Cl. 73—167)

This invention relates to new and useful improvements in orifice meters used for measuring the flow of gases or liquids, and is a continuation-in-part of an application entitled "Compensating and calibrating orifice meter", Serial No. 433,110, filed by us in the Patent Office March 4th, 1930.

In the usual type of orifice meter there is a restriction in a conduit through which the fluid passes, with pipes connected to the high and low pressure sides of said restriction, said pipes being connected to high and low pressure chambers of the meter, the chambers being joined by a U-tube containing liquid. One of said chambers, usually the high pressure chamber, has a float therein, the movement of which indicates the differential pressure on the two sides of the restriction. The movement of the float is usually transmitted to a pivoted pen arm or other indicator by a pivoted link, whereby said arm is rotated about its pivot in response to vertical movement of the float. One serious disadvantage of this type of meter having a pivoted link is that the angular movement of said arm is not always in strict or exact accordance with the movement of the float in all positions of said link. When the link connected to the float rod is in approximately horizontal position, vertical movement of the float will give minimum movement of the arm. However, as the link moves away from its horizontal position, either up or down, the movement of the indicator connected therewith becomes decreasingly smaller for equal movements of the float. This is due to the fact that the effective leverage on the pen shaft link changes as said link moves away from its horizontal position. In order to overcome this difficulty it has been usual to provide an indicator scale or dial whose graduations become increasingly larger as the link moves away from its horizontal position or to vary the mercury displacement by means of a displacement rod of varying cross-sectional area.

A primary object of this invention is to provide an orifice meter including a float mechanism and an indicating arm associated therewith with means transmitting movement of the float to the indicator arm to compensate for the above noted inaccuracies in the usual orifice meter. By the provision of this compensating mechanism the movements of the indicator arm are always in direct proportion to movements of the float, irrespective of the position of the float and indicator arm. With the improved orifice meter as disclosed in this application, it is unnecessary to provide a dial or scale whose graduations are increasingly larger as the indicator arm moves away from horizontal position, since the graduations of the scale may be uniform throughout the movement of the arm nor is it necessary to provide a compensating displacement rod.

More specifically, it is an object of this invention to provide a compensating mechanism of the above described character wherein a compensating lost motion linkage is interposed between the float and the indicator arm to compensate for variations of movement of these two members.

Another object of this invention is to provide an automatic take-up mechanism in the linkage connecting the float of an orifice meter and the indicating arm therefor, which take-up mechanism automatically eliminates all lost motion between the indicator arm and the float, and said mechanism further automatically takes up any wear that occurs between the moving parts.

Another object of this invention is to provide driving mechanism between the float and the indicator arm which mechanism affords simple and easy means of calibrating the instrument, the parts being so associated that they will not sag or move other than by movement of the float, thus eliminating the laborious hit and miss system necessary when no indication can be accurately made of each movement of the calibrating attachment during calibration.

Another object of this invention is to provide an orifice meter so constructed that it can be disassembled and cleaned with a minimum of labor.

Another object of this invention is to provide an orifice meter so constructed as to obviate the necessity of re-calibration of the mechanism after cleaning, since the meter may be readily reassembled after the cleaning operation to its original setting, so that re-calibration is not required.

These and other objects will be apparent from the following description and the appended claims when taken in conjunction with the accompanying drawings wherein:

Figure 1 is a rear view of our orifice meter with parts thereof in section, and the pipes disconnected therefrom.

Figure 2 is a side elevation thereof.

Figure 3 is an enlarged view from above partly in section showing the linkage connecting the float arm and the pen shaft, as in the construction disclosed in the former application, Serial No. 433,110.

Figure 4 is a detail sectional view taken on line 4—4 of Figure 5.

Figure 5 is a view similar to Figure 3 showing the linkage connecting the float arm and the pen shaft in the form of the invention disclosed in this application.

Figure 6 is a plan of the pen link.

Figure 7 is a plan of the pen link take-up arm.

Figure 8 is an end elevation thereof.

Figures 9, 10 and 11 are front, side and rear elevations, respectively, of the float arm link hub used for adjustments.

Figure 12 is a diagrammatic view showing the movement of the compensating links.

Referring to the drawings, Figure 1 shows an enlarged view of the rear face of the orifice meter, parts thereof being shown in section, a main casting 43 is secured to the back of the meter casing 44 in which is contained the clock, the pressure element, and the indicating or pen arms.

Casting 43 has a lower flange 45 to which is secured the float chamber 46 containing the float 47 having secured thereto the float arm 48. Float arm 48 projects upwardly through a restricted opening 49 in the flange 45, there being secured to the lower face of flange 45 around said opening a suitable composition valve seat 52 for cooperative engagement by a valve member 53 on the upper end of float 47, whereby if the device is subjected to excessive pressure the float 47 will rise and the valve 53 thereon will engage on seat 52 to prevent loss of the liquid, such as mercury through the opening 49.

The float chamber 46 has a downwardly projecting nipple 54 to which is screw threaded a coupling member 55. A lower valve seat 56 is clamped against the nipple 54 by screw-threaded coupling 55 and float 47 has a depending stem 58 to which is secured a valve 59 for cooperation with seat 56. Valve 59 is pivotally secured to stem 58 such that it may move freely in all directions to have a limited universal motion whereby it may accurately seat against valve seat 56. Thus it will be seen that excessive high pressure or excessive low pressure will not result in the loss of mercury since either valve 53 will close on seat 52 or valve 59 will close on seat 56 to prevent loss of mercury from the U-tube associated with the orifice meter.

A depending pipe 62 is secured in liquid tight engagement to nipple 54 by coupling 55, said pipe 62 having a guide bushing 63 therein for guiding rod 64 secured to the lower part of valve 59, and thus secured to float 47. By the provision of bushing 63, and guide rod 64, the float 47 is so guided that its motion is substantially vertical.

A U-tube 65 is secured to the lower end of conduit 62 as by welding or otherwise and is secured at its other end to chamber 66, as by welding. As shown in full lines in Figure 1 chamber 66 is flanged and is secured at its upper end to flange 45 of casting 43 by bolts not shown, secured to the upper flange 67 of chamber 66. The flange 45 is bored as at 68, said bore 68 being provided at its end with a threaded portion 69 for connection with a threaded nipple (not shown) leading from the high pressure side of the conduit.

The float rod 48 projects upwardly into the main casting 43 and terminates in a conical end 82. In alignment with the float rod the casting 43 has a threaded opening in the upper wall thereof adapted to receive a plug 83, said plug having an extension 84 threaded for reception in the opening in casing 43, with a stop rod 85 projecting downwardly into casing 43 and terminating in a conical seat 86. Plug 84 has an extension 87 extending in the opposite direction which is also threaded for engagement in opening in the casting 43. When the orifice meter is being shipped the plug 83 is screwed into the opening as shown in Figure 1 until the conical end 86 thereof engages with the end 82 of float rod 48 to thus hold the movable parts of the instrument in set position such that the mechanism can not be injured during shipment by relative movement of the parts thereof. When the orifice meter is to be installed the plug 83 is removed from the opening in casing 43, turned over, and screwed back into said opening by means of the threaded portion 87, to prevent loss of pressure from the chamber. Thus the single element 83 functions as a stop, and also as a plug to prevent loss of pressure. This is a feature of practical importance since neither the shipping stop nor the plug can be lost as one or the other is always used, and this unitary member is therefore always in place.

A funnel shaped opening 88 is provided in communication with the low pressure chamber 46, said opening being normally closed by a plug 89. When the plug 89 is removed mercury or other liquid may be poured into the orifice meter for charging the U-tube and the high and low pressure chambers connected thereto.

In orifice meters of the type to which this invention relates the vertical movement of the float operates an indicating or pen arm to move an indicator over a scale in accordance with the vertical movement of the float. However, due to the fact that the leverage between the vertically moving float and the indicator arm changes for various vertical positions of said float, it has been usual practice to provide an indicating scale the divisions of which are made proportionately larger for extreme positions of the float, or a compensating rod of varying cross-section areas is used in chamber 66. We have provided a novel mechanism connecting the vertically moving float arm and the indicator arm whereby the movements of the indicator arms are in direct proportion to the movements of the float arm in all positions of the float.

A flattened portion 48' is provided on the float rod 48 adjacent the upper end thereof and a pin 92 passes through this flattened portion and may be securely fastened in this flattened portion by swadging, soldering, brazing, riveting, welding or other methods. At one end this pin passes through opening 94 of adjustable guide link 93 and is a bearing fit in the link. At its opposite end said link has an enlarged opening 95 with two arcuate slots 96 concentric with opening 95. The pin 92 passes through the guide link 93 and also through a slot 97 in a motion transmission or pen shaft link 98, see Figure 6, which link 98 is on the opposite side of flattened portion 48' of float rod 48 from the link 93, as shown in Figure 5.

The guide link 93 has mounted on its large end a dial 101 shown in detail in Figures 9, 10 and 11. Dial 101 has a concentric hub portion 102 adapted to fit snugly within the opening 95 of link 93. Hub 102 has an outstanding flange member 103, of approximately the same diameter as the enlarged end of link 93. The flange 103 has openings 104 therein for the reception of screws 105 which pass through the slots 96 of link 93 and are screw threaded into a clamping ring 106 on the back of lever 93. An eccentric journal 107 passes through hub 102 for the reception of a pivot pin 108 mounted in a lug 109 on the rear face of the casting 43.

The transmission link 98 is secured to a pen operating shaft 112 by a collar 113 (Figure 5) which is fixed in the opening 114 in the end of said link, as by brazing, welding, riveting or soldering, said collar being secured to the pen operating shaft 112 by a set screw 115. The pen operating shaft passes through a stuffing box 116 which extends through the back wall of the casting 43 and into the casing 44 in which the chart or dial and the pen are housed. The stuffing box 116 is screw threadedly engaged with casting 43 as at 117, the end of said stuffing box within the casting 43 being closed by a threaded cap 118 which makes a snug fit with the pen operating shaft 112. The opposite end of the stuffing box has an inwardly projecting annular flange 121 through the central opening of which the reduced end of shaft 112 passes, a pen arm (not shown) carrying a pen being secured thereto. The pen arm shaft 112 has a conical portion 122 which bears against the annular flange 121, and these engaging surfaces are ground and lapped in to provide a tight and smooth joint at this point. A screw 120 normally closes an opening in the stuffing box 116, through which lubricant may be introduced into said stuffing box. By the structure just described it will be seen that rotation of the pen shaft link 98 will rotate pen shaft 112 due to the sleeve 113 secured to the two parts.

In order to take up any lost motion between the pin 92 carried by the float arm and the pen shaft operating link 98, said link has pivotally secured thereto a take-up link 123, pivoted at 124 to link 98. The links 98 and 123 are shown in assembled in Figure 4 and link 123 is shown in detail in Figures 7 and 8. Link 123 has a portion 125 extending outwardly and parallel to slot 97, said portion having been beveled to substantially a knife edge 126, to reduce friction. A pin 127 is secured to link 123 and passes through said link and into an opening 128 in link 98, said opening being slightly larger than the pin 127 which enters said opening, as seen in Figure 5. A spring 131 is secured at one end to pin 127 and is coiled around sleeve 113 which pivotally supports link 98, and has its other end secured in opening 132 in link 98.

It will be seen from Figure 4 that the spring 131 tends to move the take-up link 123 about its pivot 124 so that the knife edge 126 bears constantly against the pin 92 which is carried by the float arm. Since the slot 97 in link 98 is wider than the pin 92 the latter would have a limited motion with respect to link 98. By this construction lost motion between link 98 and the pin 92 is automatically taken up at all times by engagement of link 123 with pin 92, and any wear between these parts is also automatically compensated for by the link 123. The resistance to the movement of the pen shaft 112 and the parts movable therewith including the pen is very small, and the spring 131 is strong enough to transmit motion to these parts without bending. Therefore, motion of the pin 92 is directly transmitted without lost motion to the pen shaft 112.

Since the guide link 93 pivots about the pin 108 and the hub 102 is eccentric to pin 108, it will be clear that by loosening the set screws 105, the dial 101 may be partially rotated to thus move the eccentric hub 102 about pin 108 as an axis. Such movement of hub 102 functions in effect to either shorten or lengthen the link 93. This shortening or lengthening of link 93 is for the purpose of calibrating the instrument or to increase or decrease the pen travel with a given float travel. Shortening of the link 93 moves the float pin 92 closer to the pen shaft 112, about which the pen operating link 98 moves as an axis. This movement causes a greater arc of rotation of the pen shaft 112 for a given travel of the float 47. If the link 93 is lengthened, a decreased arc of travel of pen shaft 112 is provided for the same float travel. Thus accurate calibration may be made or the movements of the pen may be lengthened or shortened by simply loosening screws 105 and rotating dial 101. Indicating marks 110 are provided on dial 101 and link 93 to aid in calibration.

The linkage as above described compensates for inaccuracies of movement between the float and the pen arm as follows: Referring to Figure 12 since the pin 92 and the pivot 108 are a fixed distance apart, as the float rises from the position shown in full lines, the pin 92 moves slightly to the left thereof, thus sliding in the slot 97 in the pen link 98. Vertical movement of the pin 92, of course causes rotation of the pen shaft link 98 to carry therewith the pen shaft 112. Since link 98 is proportionately shorter than link 93, during this movement the pin 92 slides slightly in and out and to and from the pen shaft 112, thus changing the radius of action of the pin 92 about the shaft 112 as an axis.

The pin 92 takes the path A shown in Figure 12 and said pin contacts with lever 95 at point $b$ when the float is down and the parts are in the position shown in full lines. When the pin rises to the dotted line position it moves in path A whereas point $b$ moves in path B about shaft 112 as a center. When the parts reach the dotted line position pin 92 contacts with lever 98 at point $a$, whereas point $b$, has moved to $b'$. Therefore the effective leverage on link 98 changes as the float rises and falls.

By mathematical formula the proper length of the links and distances between centers can be calculated to cause a rotation of pen shaft 112 in substantially equal arc units for equal vertical movements of the float.

Ordinarily the links will be so positioned that there will be no leakage between the conical end 122 of the pen shaft 112 and the inwardly projecting flange 121 of the stuffing box 116. However, in order to prevent any possible leakage at this point, a spring 161 is shown in Figure 5 which is mounted on the pin 108 and has its end in engagement with the projecting end of the pen shaft 112. This spring 161 maintains the conical portion 122 of the cam shaft 112 into close engagement with its ground seat 121 such that there can be no leakage of lubricant at this point. In order to accommodate the spring 161 the link 93 is moved outwardly beyond the float arm 48 and a collar 163 is used on the pin 108 to rotate arm 93.

In order to provide a simple and readily adjustable mounting for the orifice meter the casing 44 has a depending mounting bracket or strap 171 thereon formed to provide an annular ring 172 at its lower end. Ring 172 has a plurality of screw-threaded openings therein for the reception of correspondingly threaded locking bolts 173.

It is believed that the operation of the above described orifice meter will be clear from the above description thereof. Due to the linkage provided between the float arm 48 and the indicator pen shaft 112, said pen shaft moves equal distances for equal movements of the float arm in all positions thereof. This is due to the fact that the slot 97 in the link 98 allows the pin 92 of the float arm to move back and forth with regard to the pen shaft, thus shortening or lengthening the effective radius of the arm 98.

By loosening of set screws 105 the dial 101 may be rotated to move hub 102 about axis 108 to thereby change the effective length of link 93 in order to calibrate instrument accurately and also in order to increase or decrease the movement of the pen shaft for equal movements of the float arm. The take-up lever 123 automatically eliminates lost motion between pin 92 and the lever 98 connected to the pen shaft.

In Figure 3, the parts are similar to those shown in Figure 5, but the links 93 and 98 are both arranged on the same side of the flat section 48' of the float arm.

Although the compensating linkage has been described in detail in relation to an orifice meter having a float, it will be clearly understood that our invention is not limited to orifice meters, since the compensating movement may be used in any float gauge, or in fact in any mechanical movement wherein reciprocatory motion is to be converted into rotary motion with accuracy.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a link movement for orifice meters, a reciprocatory pin, a link having a slot in which said pin is positioned, a lever pivoted on said link and extending substantially parallel to said slot, and a spring pressing said lever against said pin to thereby automatically take up lost motion between said slot and said pin.

2. The invention as defined in claim 1 wherein the portion of said lever which presses against said pin is beveled to substantially a knife edge.

3. In an instrument of the class described, a swinging arm mounted on a pivot whereby any given point on said arm traces an arc of a circle on swinging movement of said arm, a second arm mounted on a second pivot spaced from said first pivot, connecting means having a sliding pivotal contact with said first arm and linking said first arm to said second arm, and a linearly movable member secured thereto, said second arm varying the effective leverage of said first arm for different positions of said linearly movable connecting means, whereby to effect angular movement of said first arm within a predetermined range substantially directly proportional to the linear movement of said movable connecting means linking said first arm to said second arm.

4. In a mechanical linkage for converting uniform rectilinear motion into substantially uniform angular motion; a member adapted to bodily reciprocate substantially in a straight line in response to the substantially rectilinear movement of an element to which said member is attached, a pin on said member and movable as a unit therewith; a fixed pivot pin; an adjusting link connecting said movable pin to said fixed pivot pin, said link being provided with means to vary the linear distance between the movable pin and the fixed pivot pin; a driven link, loosely engaging said movable pin so that it may have a limited motion relative thereto, reciprocating movements of said movable pin oscillating said driven link, and a shaft eccentric to said fixed pivot pin, said driven link being secured to said shaft, said adjusting link automatically shifting said movable pin laterally with respect to said fixed pin as said member reciprocates.

5. In a mechanical linkage for converting substantially uniform rectilinear motion to substantially uniform angular motion, a bodily reciprocable member provided with a pivot pin extending therethrough; a calibrating and adjusting arm pivoted on the pivot pin on one side of the bodily reciprocable member; a pivoted pen actuating arm supported on said pivot pin on the other side of said bodily reciprocable member, the said pen actuating arm being slotted at the end that is supported by the pivot pin; and a pivotal support for said calibrating and adjusting arm, said pivotal support being offset from the pivot of said pen actuating arm, so that the substantially uniform rectilinear motion of the reciprocable member is converted to uniform angular motion of said pen actuating arm about the pivot pin as a center.

6. In a mechanical linkage for changing substantially uniform rectilinear motion to substantially uniform angular motion, a liquid actuated member; a member actuated by said liquid actuated member and constrained to bodily reciprocate, a pivot pin on said bodily reciprocable member; a fixed pivot; a link pivoted on said fixed pivot for constraining the pivot pin so that it revolves bodily about said fixed pivot; and a link supported at one end on the pivot pin by a sliding pivotal contact and constrained so that the supported end of said link travels in an arcuate path; the arcuate movement being substantially uniform for uniform linear displacements of said fluid actuated member.

7. The construction as claimed in claim 6 in which the fixed pivot is provided with means to adjust its position relative to the pivot pin for the purpose of calibrating the mechanism.

8. In an instrument of the class described, a reciprocatory member, means to reciprocate said member, a rotary shaft, a link secured to said shaft and loosely engaging the reciprocatory member to be oscillated by reciprocation thereof, and a compensating lever pivoted eccentric to said shaft and pivoted to said reciprocatory member for shifting said reciprocatory member laterally with respect to said shaft as said member reciprocates, said lever varying the effective leverage of said link to convert uniform increments of rectilinear motion of said member into substantially uniform increments of angular motion of said shaft.

9. In an instrument of the class described, a reciprocatory member, means to reciprocate said member, a rotary shaft, a link secured to said shaft and having a slot, a pin on said reciprocatory member engaged in said slot, and a pin shifting lever pivoted eccentric to said shaft and pivoted to said reciprocatory member for shifting said pin laterally of said shaft within said slot as said member reciprocates to vary the effective leverage of said link to convert substantially uniform increments of rectilinear motion of said member into substantially uniform increments of angular motion of said shaft.

10. The invention as defined in claim 9 wherein said link is provided with a take-up device engaging said pin to eliminate lost motion between the pin and slot.

11. In an instrument of the class described, a reciprocatory float-actuated rod, a link pivoted to said float-actuated rod, a fixed pivot supporting the opposite end of said link, a pin on said rod, a recorder-actuating link, and a fixed pivot for said recorder-actuating link eccentric to the pivot of said first link, said recorder-actuating link engaging the pin in a manner to be oscillated by movements of said pin, said first link being of such length that equal increments of reciprocatory movement of said pin are converted into substantially equal increments of oscillatory movement of said recorder-actuating link.

12. The invention as defined in claim 11 including means to vary the effective length of said first link.

13. In an instrument of the class described, a reciprocatory member, means to reciprocate said member, a pivoted link, said link and reciprocatory member having a slip connection to cause oscillation of said pivoted link when said member reciprocates and to allow lateral movements of said reciprocatory member, and a second pivoted link, said second link being pivoted to said reciprocatory member and of such effective length as to cause said lateral movement of said member as the same is reciprocated.

14. The invention as defined in claim 13 including means to adjust the effective length of one of said links to thereby calibrate the meter.

15. In an instrument of the class described, an arm mounted to swing on a fixed pivot, a second arm mounted on a second fixed pivot spaced from said first pivot in a plane substantially normal to the axis of said first pivot, and a linearly movable float rod having pivotal connection with said arms.

16. In an instrument of the class described, an arm mounted to swing on a fixed pivot, a second arm mounted on a second pivot spaced from said first pivot, a linearly movable float rod having a sliding pivotal connection with said first arm and a pivotal connection with said second arm whereby to effect angular movements of said first arm within a limited range substantially directly proportional to the linear movement of said float rod.

17. In an instrument of the class described, an arm mounted to swing on a fixed pivot, a second arm mounted on a fixed pivot and pivotally connected to said first arm by a sliding pivot, a linearly movable float rod having a pivotal connection with said second arm whereby linear movement of said float arm effects substantially directly proportional angular movement of said first arm.

18. In an instrument of the class described, an arm mounted to swing on a fixed pivot, a second arm mounted on a second pivot spaced from said first pivot, a linearly movable float rod having a sliding pivotal connection with said first arm and a pivotal connection with said second arm, and means to vary the effective length of said second arm between pivots for calibration of said instrument.

19. In an orifice meter including a fluid actuated float rod, a link mounted on a fixed pivot at one end, means for causing the other end of said link to move in an arcuate path upon rectilinear movement of said float rod, a guide link movable about a pivot point spaced from said first pivot in a plane substantially normal to the axis of said first pivot and pivotally coupled to said first link, and a recording pen actuated by rotation of said first link.

20. In an instrument of the class described, an arm mounted to swing on a fixed pivot, a second arm of greater length than said first arm mounted on a second fixed pivot spaced from said first pivot, and a linearly movable float rod having a pivotal connection with one of said arms and a sliding pivotal connection with the other of said arms.

ALLEN D. MacLEAN.
WALTER H. PARKER.
NELSON J. SEIBERT.